Patented Sept. 13, 1949

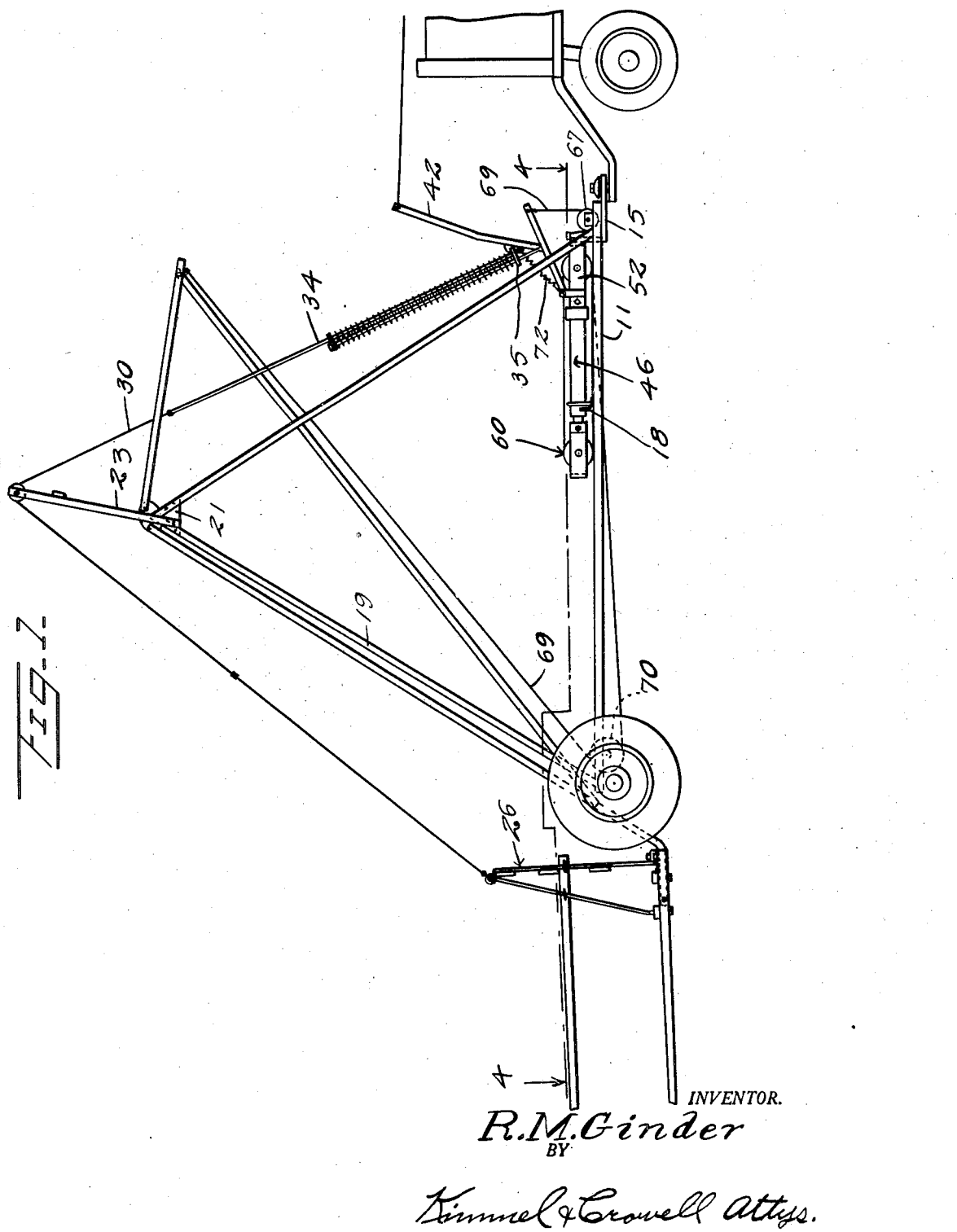

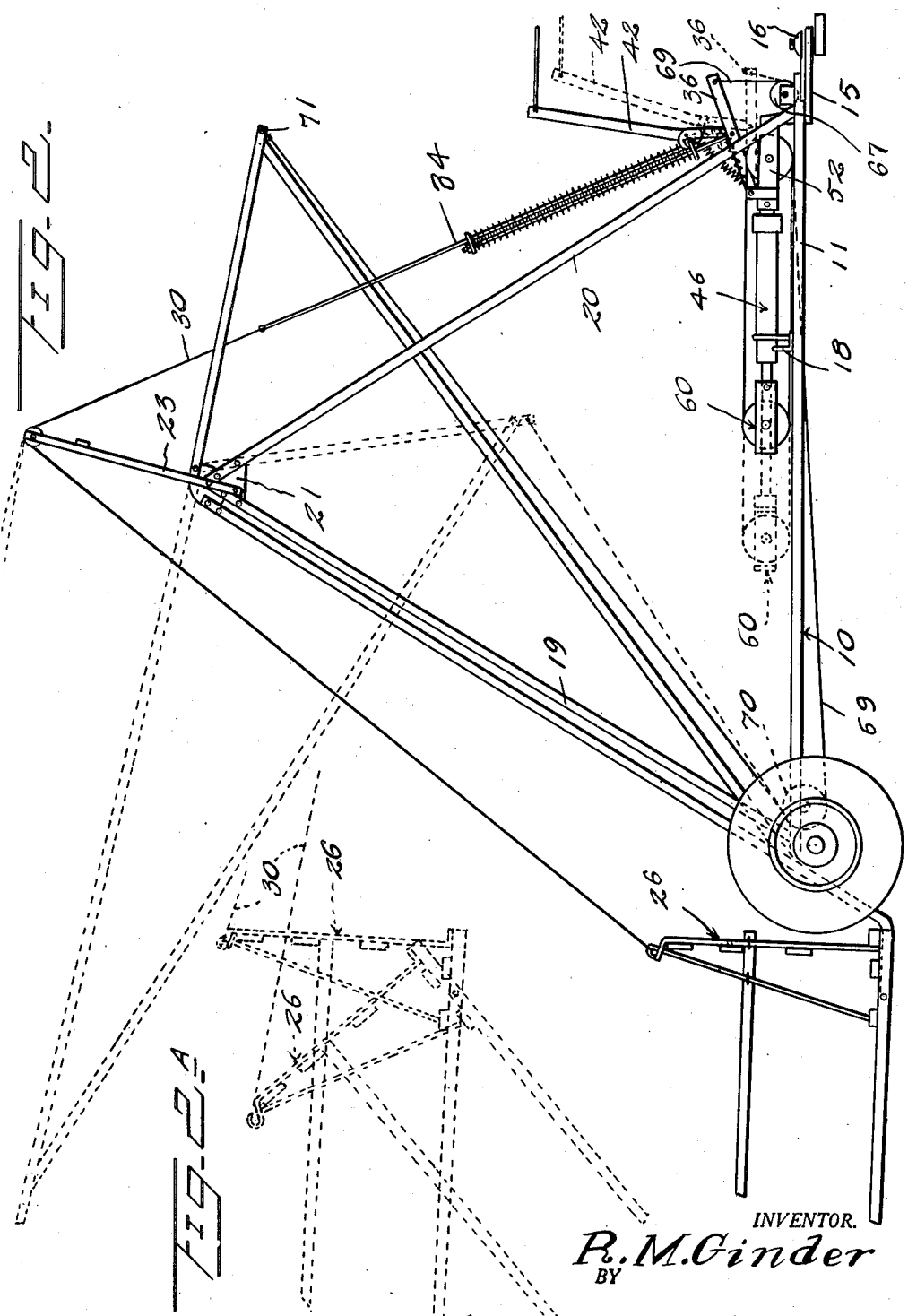

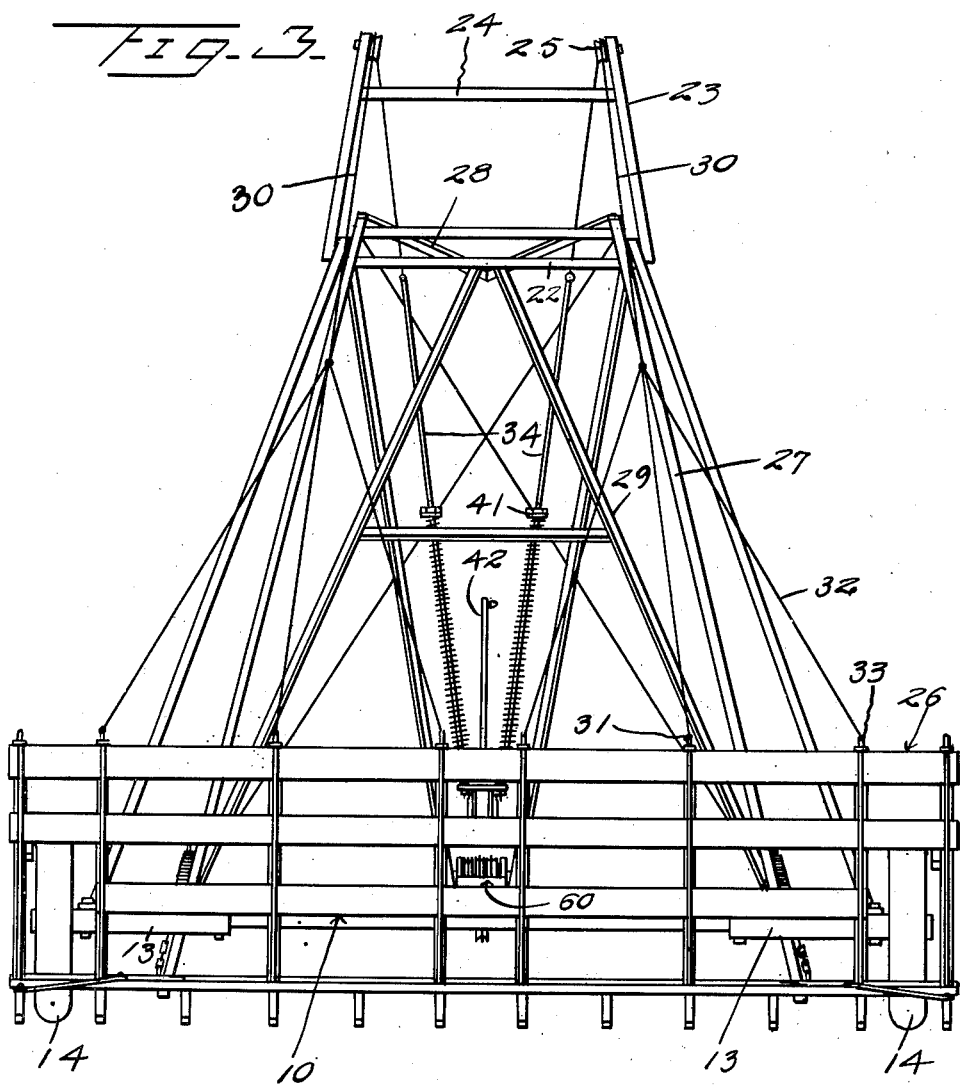

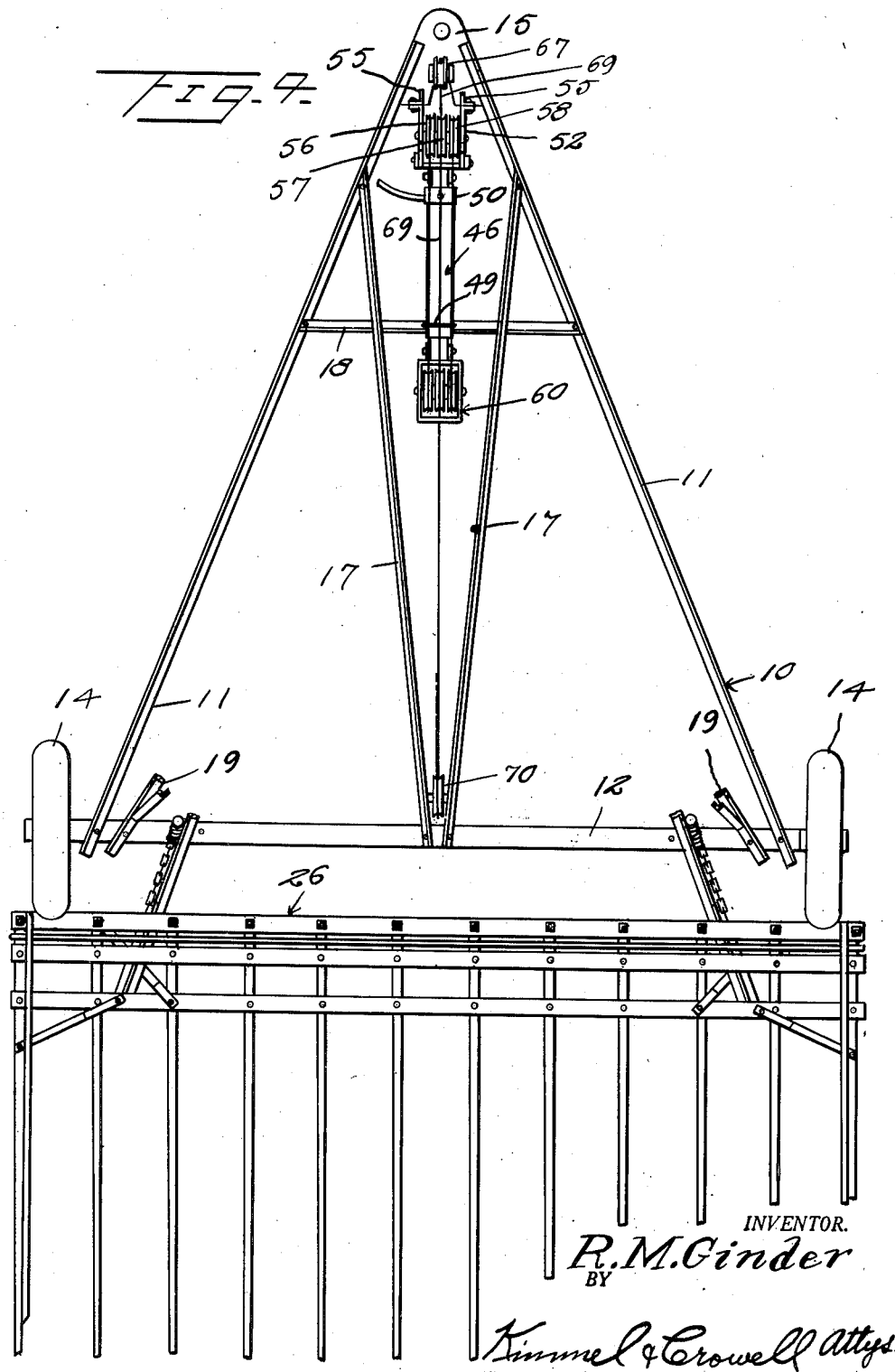

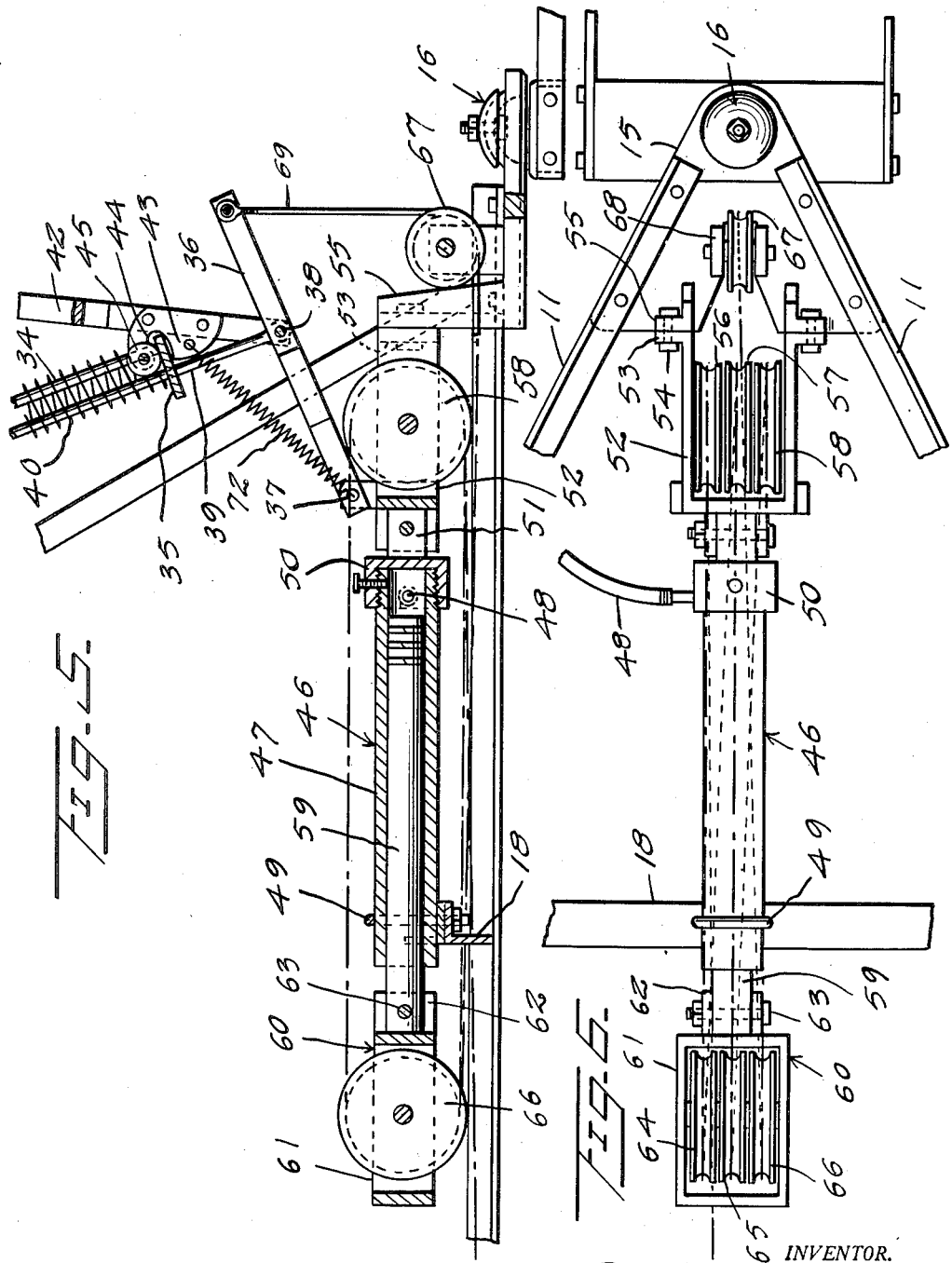

2,481,994

UNITED STATES PATENT OFFICE 2,481,994

HAY STACKER AND LOADER

Raymond M. Ginder, Salina, Kans., assignor, by mesne assignments, to The Wyatt Manufacturing Company, Incorporated, Salina, Kans., a corporation of Kansas Application October 18, 1945, Serial No. 623,067

5 Claims. (Cl. 214—140)

This invention relates to hay stackers and loaders.

An object of this invention is to provide in a hay stacker and loader a hydraulic operator by means of which the sweep may be elevated from a lower sweeping position to an upper carrying, loading and stacking position.

Another object of this invention is to provide in a hay stacker and loader an improved latching means for latching the sweep in loading and lifting position.

A further object of this invention is to provide in a hay stacker and loader an improved means for maintaining the sweep in a loaded position while the sweep is being elevated.

A further object of this invention is to provide a means for raising the front tips of the hay fork before the derrick starts elevating, so as to thereby retain the load during the elevating of the fork, and/or shifting of the device.

A further object of this invention is to provide an improved hitch whereby the device may be coupled or uncoupled to a tractor.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of a hay stacker and loader constructed according to an embodiment of this invention, Figure 2 is a view similar to Figure 1 on a slightly enlarged scale and showing in dotted line the manner in which the sweep is raised, Figure 2A is a fragmentary side elevation in dotted lines showing the positions of the sweep when elevated and loaded and also when disposed in a discharging position, Figure 3 is a detail front elevation of the device, Figure 4 is a sectional view partly broken away taken on the line 4—4 of Figure 1, Figure 5 is a fragmentary longitudinal section of the hydraulic sweep operator, and Figure 6 is a fragmentary plan view of the operator.

Referring to the drawings, the numeral 10 designates generally a mobile frame which comprises a pair of rearwardly convergent base bars 11 connected together at their forward divergent ends to a front bar 12, which has secured thereto a pair of outwardly extending stub shafts or axles 13 on which wheels 14 are rotatably mounted. The rear or convergent ends of the bars 11 are secured to a plate 15, which is provided with coupling or hitch means 16 by means of which the plate 15 may be connected to a tractor vehicle. The frame 10 also includes a pair of forwardly divergent angle bars 17 which are connected at their rear divergent ends to the side bars 11 and are connected at their forward convergent ends to the front bar 12.

A transversely extending bracing bar 18 extends between the side bars 11 and is connected to the rearwardly divergent bars 17 between the ends of the latter. The frame 10 also includes two pairs of upwardly convergent bars 19 and 20 which are secured at their lower divergent ends to the side bars 11 and the front bar 12 and are connected together at their upper convergent ends by means of a substantially triangularly-shaped plate 21. The plates 21 are connected together by means of a connecting bar 22 so as to maintain the upper ends of the side bars 19 and 20 in spaced apart relation. A pair of upwardly extending bars 23 extend upwardly from the plates 21 and the convergent ends of the side bars 19 and 20 and are connected together by means of a connecting bar 24. A sheave or pulley 25 is rotatably carried by the upper end of each bar 23.

A sweep, generally designated as 26, is rockably carried by the frame 10 and the sweep 26 is rockably supported by means of a rocking frame which includes a pair of elongated bars 27 disposed in upwardly convergent relation and secured at their lower ends to the sweep 26. The upper ends of the bars 27 have secured through and extending rearwardly therefrom a pair of rearwardly convergent bars 28, and the bars 28 have secured to the rear convergent ends thereof a pair of forwardly divergent elongated bars 29. The forward or lower ends of the bars 29 are secured to the bars 27 above the lower or forward ends thereof. The sweep 26 is maintained in a substantially horizontal loading position by means of a pair of elongated flexible members or cables 30, which are secured at their forward ends, as at 31, to the rear wall or sweep 26 and are trained over the pulleys or sheaves 25. A pair of bracing cables 32 are connected at their lower forward ends to the rear wall of the sweep 26, as indicated at 33, at a point laterally or spaced from the connection 31 of the cable 30. The two cables 30 are connected to an elongated rod 34 extending downwardly and rearwardly and the two rods 34 are fixedly secured to a plate 35. A rock lever 36 is pivotally mounted at one end, as indicated at 37, on the hydraulic operator, to be hereinafter described, and is pivotally secured between the ends thereof, as indicated at 38, to an elongated cushioning rod 39 which slidably engages through the plate 35.

A pair of springs 40 engage about both of the rods 34 and 39 and the upper ends of the springs 40 bear against a plate or washer 41 which is fixed to the upper end of the rod 39. The springs 40 are compression springs and are normally under tension so as to constantly urge the bar or plate 35 downwardly to latched position. The rods 34 are latched in sweep loading position by means of a latching lever 42, which is pivotally mounted on the pivot member 38, and is provided with a latching plate 43 having a notch or recess 44 within which the plate 35 is adapted to engage. A roller 45 is carried by the plate 33 and is adapted to engage on the upper side of the plate or bar 43. The plate or bar 43 forms a keeper for latching the bar 35 in its lowermost position, so as to thereby maintain the sweep 26 in a horizontal loading or lifting position. The sweep 26 is adapted to be elevated or lowered by means of a hydraulic operator, generally designated as 46. The operator 46 includes a hydraulic cylinder 47 which is adapted to be connected by means of a hose or flexible member 48 to a source of fluid pressure supply. The cylinder 47 is fixedly secured by means of a U-clamp 49 or the like to the transverse bar 18 and the cylinder 47 at its rear end is formed with a cap or head 50. The cap or head 50 has secured thereto a stud 51 and a U-shaped member 52 is secured to the stud 51 and extends rearwardly therefrom. The U-shaped member 52 is provided with oppositely extending ears 53 at the rear end thereof which are secured by fastening members 54 to upwardly extending ears 55 carried by the triangular plate 15.

A plurality of pulleys 56, 57 and 58 are rotatably mounted between the arms of the U-shaped member 52, the purpose for which will be hereinafter described. The cylinder 47 has slidably mounted therein a plunger or piston 59 which has secured to the extended end thereof a sheave assembly, generally designated as 60. The sheave assembly 60 includes a rectangular frame 61 formed with rearwardly extending arms 62, which are secured by means of a fastening member 63 to the extended end of the plunger or piston 59. A plurality of grooved pulleys 64, 65 and 66 are journalled between the longitudinal sides of the frame 61 and are correlated with the pulleys 56, 57 and 58. A pulley 67 is rotatably mounted between a pair of ears 68 rising from the plate 15 and a cable or flexible member 69 is trained underneath the pulley 67. One end of the cable 69 is secured to the rock lever 36 and the cable is then extended forwardly about pulley 66, then extended rearwardly to pulley 58, extended forwardly to pulley 65, rearwardly to pulley 57, forwardly to pulleys 64 and rearwardly about pulley 56. The cable 69 is then extended forwardly to a hydraulic pulley 70 rotatably carried by the forward or divergent ends of the intermediate bars 17. The cable 69 is then extended upwardly and rearwardly and is secured, as at 71, to the rear end of the swinging frame, which supports the sweep 26.

In the use and operation of this device in the loading position of the sweep 26, the sweep will be in the full line positions shown in Figures 1 and 2. After the sweep has been loaded it may be elevated by outward movement of the hydraulic plunger or piston 29. Outward movement of this plunger or piston will lengthen the stretches of the cables between the pulleys 56, 57, 58, 64, 65 and 66 and cause the supporting frame for the sweep to rock to the dotted line position shown in Figures 2 and 2A. As the forward sheave 60 is moved forwardly the rear end of the cable 69 will be drawn downwardly thereby pulling the releasing cables 30 downwardly until the lever 36 assumes the dotted line position shown in Figure 2. The downward rocking of lever 36 will pull the trip assembly downwardly and cause the sweep 26 to rock on the supporting levers thereby raising the tips of the teeth so that the load will not slip off of the sweep during subsequent movement thereof. The device may then be moved over the ground to the desired point with the sweep in the elevated position and when it is desired to discharge the material from the sweep 26, releasing lever 42 may be pulled rearwardly whereupon the weight of the material in the sweep 26 will cause the sweep to rock downwardly on the supporting bars 27 against the tension of the springs 40. The upward pull on the rods 34 will draw connecting bar 35 upwardly compressing the springs 40, so as to cushion the downward swing of the sweep and after the sweep has discharged its load the springs 40 will pull the rods 34 downwardly thereby raising the sweep 26 to its horizontal operative position. The bar 35 will strike the roller 45 causing latching lever 42 to swing rearwardly and this lever will be swung forwardly to a latching position with the bar 35 engaging in the notch 34 by means of a latching spring 72, which is connected at one end to the latching plate 43 and at the other end to the pivot 37 for the lever 36.

What I claim is:

1. In a hay stacker and loader, a mobile frame, a swingable sweep carried by said frame, a flexible elevating cable for said sweep, a flexible sweep releasing cable, fluid operated means for elevating said sweep, a rock lever adjacent said means, said elevating cable connected at one end to said lever, spring-pressed means connected between said lever and said releasing cable whereby to resiliently hold said sweep in horizontal loading position, and releasable latch means carried by said lever engaging said spring-pressed means for locking said sweep in horizontal loading position said fluid operated means upon actuation thereof to sweep elevating position rocking said lever downwardly to thereby raise the tip of the sweep.

2. In a hay stacker and loader as set forth in claim 1 wherein said latch means includes a latch lever rockably carried by said first lever, and a latch hook carried by said latch lever.

3. A hydraulic operator for a hay stacker and loader having a mobile frame and a swingable sweep comprising a hydraulic cylinder, a piston slidable in said cylinder, a sheave carried by said piston, a sheave mounted on said cylinder, a flexible member trained about said sheaves, a sweep elevating member, one end of said flexible member secured to said sweep elevating member, the other end of said flexible member secured to said sweep whereby said hydraulic operator upon actuation thereof to sweep elevating position will initially raise the tip of the sweep.

4. A hydraulic operator for a hay stacker and loader having a swingable sweep comprising a hydraulic cylinder, a piston slidable in said cylinder, a sheave on said cylinder, a sheave on said piston, and a flexible elevating cable for said sweep, said cable being looped about both of said sheaves whereby shifting of one of said sheaves relative to the other will effect an increased swinging of said sweep.

5. In a hay stacker and loader, a swingable sweep, a flexible elevating cable for said sweep, a flexible sweep releasing cable, fluid operated means for elevating said sweep, a lever, said elevating cable connected at one end to said lever, resilient means connected between said lever and said releasing cable, said fluid operated means upon actuation thereof to sweep elevating position rocking said lever to raise the tip of the sweep.

RAYMOND M. GINDER.

REFERENCES CITED

The following references are of record in the file of this patent:

UNITED STATES PATENTS

| Number | Name | Date |
|---|---|---|
| 1,866,801 | Ferris | July 12, 1932 |
| 2,019,938 | Stephens | Nov. 5, 1935 |
| 2,135,440 | Longenecker et al. | Nov. 1, 1938 |
| 2,242,511 | Cook | May 20, 1941 |
| 2,288,496 | Swedberg | June 30, 1942 |
| 2,295,917 | Schwan | Sept. 15, 1942 |
| 2,351,104 | Carter | June 13, 1944 |
| 2,367,150 | Spaeth | Jan. 9, 1945 |
| 2,372,908 | Messing | Apr. 3, 1945 |
| 2,401,142 | Dokken | May 28, 1946 |